(12) United States Patent
Elms et al.

(10) Patent No.: US 7,253,996 B2
(45) Date of Patent: Aug. 7, 2007

(54) METHOD AND ARC FAULT CIRCUIT INTERRUPTER EMPLOYING A HYSTERESIS VALUE FOR COMPRESSOR RUMBLE

(75) Inventors: Robert T. Elms, Monroeville, PA (US); Kevin L. Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 240 days.

(21) Appl. No.: 11/100,363

(22) Filed: Apr. 6, 2005

(65) Prior Publication Data

US 2006/0227468 A1    Oct. 12, 2006

(51) Int. Cl.
*H02H 3/08* (2006.01)
(52) U.S. Cl. .............. 361/2; 361/5; 361/93.1; 361/102; 361/42
(58) Field of Classification Search .......... 361/20, 361/93.1, 102
See application file for complete search history.

(56) References Cited

U.S. PATENT DOCUMENTS

| | | | |
|---|---|---|---|
| 5,224,006 A | | 6/1993 | MacKenzie et al. |
| 5,691,869 A | | 11/1997 | Engel et al. |
| 5,818,237 A | * | 10/1998 | Zuercher et al. ......... 324/536 |
| 5,839,092 A | * | 11/1998 | Erger et al. ............ 702/58 |
| 5,933,305 A | * | 8/1999 | Schmalz et al. ......... 361/42 |
| 6,246,556 B1 | | 6/2001 | Haun et al. |
| 6,259,996 B1 | * | 7/2001 | Haun et al. ............ 702/58 |
| 6,477,021 B1 | | 11/2002 | Haun et al. |
| 6,570,392 B2 | * | 5/2003 | Macbeth et al. ......... 324/536 |
| 6,577,138 B2 | * | 6/2003 | Zuercher et al. ......... 324/536 |
| 6,650,516 B2 | | 11/2003 | Langford et al. |
| 6,653,219 B2 | | 11/2003 | Fukuyama |
| 7,068,480 B2 | * | 6/2006 | Wong et al. ........... 361/42 |
| 2003/0072113 A1 | | 4/2003 | Wong et al. |

OTHER PUBLICATIONS

Microchip Technology Inc., "Save More Energy with PIC Microcontrollers featuring nanoWatt Technology", www.microchip.com/nanowatt, 2003, 2 pp.
IAEI News, "Five New Categories for AFCI Devices Under UL 1699", 2003, p. 94.
Underwriters Laboratories, "Arc Fault Circuit Interrupters—UL 1699", Dec. 2000, pp. 33, 34, 43-45.

* cited by examiner

*Primary Examiner*—David Bruce
*Assistant Examiner*—Michael Brandt
(74) *Attorney, Agent, or Firm*—Martin J. Moran

(57) ABSTRACT

An arc fault detection circuit collects samples of sensed current, determines a peak current value from the samples for each line cycle, determines a hysteresis value for a compressor load as a function of differences between the peak current values, and generates a trip signal responsive to the sensed current and the hysteresis value. The circuit determines a difference value for each line cycle from the present peak current value less the previous peak current value, low pass filters the difference value to provide a low pass filtered value, determines a peak value from the low pass filtered value, determines that the absolute value of the low pass filtered value is less than a portion of the peak value and responsively saves the peak value, and determines the hysteresis value as a function of the saved peak value. An operating mechanism opens separable contacts responsive to the trip signal.

15 Claims, 8 Drawing Sheets

METHOD AND ARC FAULT CIRCUIT INTERRUPTER EMPLOYING A HYSTERESIS VALUE FOR COMPRESSOR RUMBLE

CROSS-REFERENCE TO RELATED APPLICATION

This application is related to commonly assigned:
U.S. patent application Ser. No. 10/895,158, filed Jul. 20, 2004, entitled "Arc Fault Circuit Interrupter".

BACKGROUND OF THE INVENTION

1. Field of the Invention

This invention relates generally to circuit interrupters and, more particularly, to circuit interrupters including an arc fault trip mechanism which responds to sputtering arc faults. The invention also relates to a method for determining a hysteresis value for an arc fault circuit interrupter.

2. Background Information

Arcing is a luminous discharge of electricity across an insulating medium, usually accompanied by the partial volatilization of electrodes. An arc fault is an unintentional arcing condition in an electrical circuit. Arc faults can be caused, for instance, by worn insulation between adjacent bared conductors, by exposed ends between broken conductors, by faulty electrical connections, and in other situations where conducting elements are in close proximity.

Arc faults in systems can be intermittent since the magnetic repulsion forces generated by the arc current force the conductors apart to extinguish the arc. Mechanical forces then bring the conductors together again in order that another arc is struck.

Circuit interrupters include, for example, circuit breakers, contactors, motor starters, motor controllers, other load controllers and receptacles having a trip mechanism. Circuit breakers are generally old and well known in the art. Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which is heated and bends in response to a persistent overcurrent condition. The bimetal, in turn, unlatches a spring powered operating mechanism, which opens the separable contacts of the circuit breaker to interrupt current flow in the protected power system. An armature, which is attracted by the sizable magnetic forces generated by a short circuit or fault, also unlatches, or trips, the operating mechanism.

Recently, there has been considerable interest in providing protection against arc faults. Because of their intermittent and high impedance nature, arc faults do not generate currents of either sufficient instantaneous magnitude or sufficient average RMS current to trip the conventional circuit interrupter. Even so, the arcs can cause damage or start a fire if they occur near combustible material. It is not practical to simply lower the pick-up currents on conventional circuit breakers, as there are many typical loads, which draw similar currents and would, therefore, cause nuisance trips. Consequently, separate electrical circuits have been developed for responding to arc faults. See, for example, U.S. Pat. Nos. 5,224,006; and 5,691,869.

For example, an arc fault circuit interrupter (AFCI) is a device intended to mitigate the effects of arc faults by functioning to deenergize an electrical circuit when an arc fault is detected. Non-limiting examples of AFCIs include: (1) arc fault circuit breakers; (2) branch/feeder arc fault circuit interrupters, which are intended to be installed at the origin of a branch circuit or feeder, such as a panelboard, and which may provide protection from ground faults (e.g., greater than 40 mA) and line-to-neutral faults (e.g., greater than 75 A); (3) outlet circuit arc fault circuit interrupters, which are intended to be installed at a branch circuit outlet, such as an outlet box, in order to provide protection of cord sets and power-supply cords connected to it (when provided with receptacle outlets) against the unwanted effects of arcing, and which may provide protection from line-to-ground faults (e.g., greater than 75 A) and line-to-neutral faults (e.g., 5 to 30 A, and greater than 75 A); (4) cord arc fault circuit interrupters, which are intended to be connected to a receptacle outlet, in order to provide protection to an integral or separate power supply cord; (5) combination arc fault circuit interrupters, which function as either a branch/feeder or an outlet circuit AFCI; and (6) portable arc fault circuit interrupters, which are intended to be connected to a receptacle outlet and provided with one or more outlets.

There is room for improvement in arc fault circuit interrupters and in methods for interrupting arc faults.

SUMMARY OF THE INVENTION

Various different compressors have different levels of "rumble," which is a periodic cycle-to-cycle variation (e.g., over a plurality of cycles; over about 30-60 cycles) of current phase and current amplitude. For example, the peak current for an alternating current cycle varies such that one peak current value is higher than the preceding or following peak current value. For example, in a 60 Hz system, this results in a 30 Hz amplitude modulation of the load current.

Since certain arc fault algorithms, such as, for example, a differential loads masking test algorithm, look for cycle-to-cycle changes in peak current, periodic cycle-to-cycle changes in such peak current become a noise level that must be ignored.

This need and others are met by the present invention, which detects and measures this periodic noise level and, also, ignores noise attributed to arc fault conditions. This provides a numerical value to adjust the hysteresis value of the differential loads masking test algorithm based upon the measurement of such noise or "rumble" caused by a compressor load. This measurement may also be advantageously employed to assist in the identification of a load that is a compressor.

In accordance with one aspect of the invention, an arc fault circuit interrupter comprises: a line terminal; a load terminal; separable contacts electrically connected between the line terminal and the load terminal; a current sensor adapted to sense current flowing between the line terminal and the load terminal and through the separable contacts, the sensed current including a plurality of line cycles; an arc fault detection circuit adapted to collect a plurality of samples of the sensed current for each of the line cycles, determine a peak current value from the samples of the sensed current for each of the line cycles, determine a difference value for each of the line cycles from the peak current value of a corresponding one of the line cycles less the peak current value of the previous one of the line cycles, change the sign of the difference value on alternate ones of the line cycles, low pass filter the changed sign difference value for each of the line cycles to provide a low pass filtered value for each of the line cycles, determine a peak value from the absolute value of the low pass filtered value for each of the line cycles over a predetermined count of the line cycles, save the peak value as a saved peak value after the predetermined count of the line cycles, determine a hysteresis value as a function of the saved peak value, and generate a trip signal responsive to the sensed current and the hysteresis value; and an operating mechanism adapted to open the separable contacts responsive to the trip signal.

As another aspect of the invention, a method of determining a hysteresis value for an arc fault circuit interrupter comprises: sensing a plurality of samples of current for each of a plurality of line cycles; determining a peak current value from the samples of current for each of the line cycles; determining a difference value for each of the line cycles from the peak current value of a corresponding one of the line cycles less the peak current value of the previous one of the line cycles; changing the sign of the difference value on alternate ones of the line cycles; low pass filtering the changed sign difference value for each of the line cycles to provide a low pass filtered value for each of the line cycles; determining a peak value from the absolute value of the low pass filtered value for each of the line cycles over a predetermined count of the line cycles; saving the peak value as a saved peak value after the predetermined count of the line cycles; and determining a hysteresis value as a function of the saved peak value.

The method may output the current from the arc fault circuit interrupter to a load which is a compressor; and confirm that the load is the compressor when a portion of the saved peak value is greater than a predetermined value.

The method may employ a value, low_pass, as the low pass filtered value; employ a value, peakΔ, as the difference value; employ an integer, n, to identify the corresponding one of the line cycles; and calculate the low pass filtered value from: low_pass=low_pass+{[peakΔ]*(−1)$^n$}−(low_pass)/16.

The method may determine the difference value, the low pass filtered value and the peak value for about ninety of the line cycles before saving the peak value then resetting the low pass filtered value and the saved peak value and determining a new value of the hysteresis value.

As another aspect of the invention, an arc fault circuit interrupter for a compressor load comprises: a line terminal; a load terminal; separable contacts electrically connected between the line terminal and the load terminal; a current sensor adapted to sense current flowing between the line terminal and the load terminal and through the separable contacts, the sensed current including a plurality of line cycles; an arc fault detection circuit adapted to collect a plurality of samples of the sensed current for each of the line cycles, determine a peak current value from the samples of the sensed current for each of the line cycles, determine a hysteresis value for the compressor load as a function of differences between the peak current values of the line cycles, and generate a trip signal responsive to the sensed current and the hysteresis value; and an operating mechanism adapted to open the separable contacts responsive to the trip signal.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with a single pole branch/feeder arc fault circuit interrupter (AFCI), although the invention is applicable to a wide range of AFCIs including one or more poles.

Figure 1:
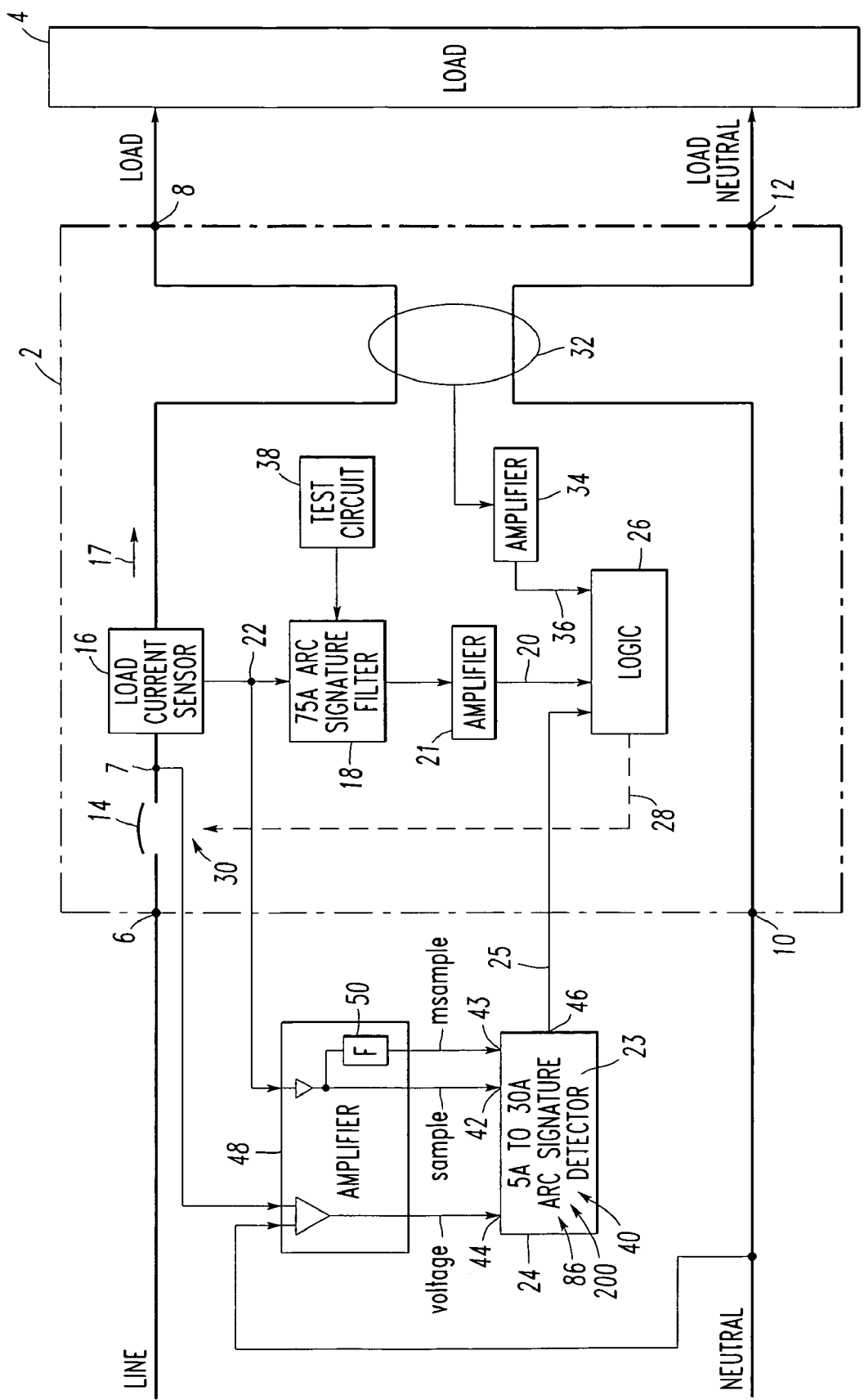
FIG. 1 is a block diagram of a single pole branch/feeder arc fault circuit interrupter in accordance with the present invention.

Referring to FIG. 1, an arc fault circuit interrupter, such as circuit breaker 2, is for an electrical circuit associated with one or more different types of loads, such as load 4. The circuit breaker 2 includes a line terminal 6 and a load terminal 8. If the circuit breaker 2 is optionally adapted to provide ground fault protection, then it also includes a line neutral terminal 10 and a load neutral terminal 12. As is conventional, separable contacts 14 are electrically connected between the line terminal 6 and the load terminal 8. A load current sensor 16 is adapted to sense current 17 flowing between the line and load terminals 6,8 and through the separable contacts 14. Here, the current 17 is associated with one of the different types of loads and includes a plurality of alternating current line cycles. As is also conventional, a first arc fault detection circuit 18 (e.g., a 75 A arc signature filter) is adapted to generate a first trip signal 20 through amplifier 21 responsive to the sensed current 22 from the current sensor 16. Suitable arc fault detection circuits, such as the circuit 18, are disclosed, for example, in U.S. Pat. Nos. 5,224,006; 5,691,869; and 5,818,237, which are hereby incorporated by reference herein.

A second arc fault detection circuit 24 (e.g., 5 A to 30 A arc signature detector) is adapted to collect a plurality of samples of the sensed current 22 for each line cycle, determine a peak current value from those samples for each line cycle, determine a difference value for each line cycle from the peak current value of a corresponding line cycle less the peak current value of the previous line cycle, change the sign of the difference value on alternate ones of the line cycles, low pass filter the changed sign difference value for each of the line cycles to provide a low pass filtered value for each of the line cycles, determine a peak value from the absolute value of the low pass filtered value for each of the line cycles over a predetermined count of the line cycles, save the peak value as a saved peak value after the predetermined count of the line cycles, determine a hysteresis value 23 as a function of the saved peak value, and generate a second trip signal 25 responsive to the sensed current 22 and the hysteresis value 23.

Although not required, the circuit breaker 2 may include a ground fault current sensor 32 (e.g., personnel protection; 5 mA; equipment protection; 30 mA) and a corresponding amplifier 34, which generates a ground fault trip signal 36 to trip circuit 26. As is also not required, the first arc fault detection circuit 18 includes a suitable test circuit 38, which generates the first trip signal 20 in response to a user request.

The trip circuit 26 is adapted to generate a third trip signal 28 responsive to the first and second trip signals 20,25. An operating mechanism 30 is adapted to open the separable contacts 14 responsive to the third trip signal 28.

The second arc fault detection circuit 24 may be, for example, a suitable PIC® model microprocessor (μP) as marketed by Microchip Technology Inc. of Chandler, Ariz., including, for example, internal memory for a suitable firmware routine 40, plural analog inputs, such as 42,43,44, and plural I/O lines, such as output 46. Upstream of the second arc fault detection circuit 24 is a suitable amplifier circuit 48, which buffers the analog sensed current 22 from the load current sensor 16 to the first analog input 42 (sample), which buffers and filters the analog sensed current 22 from the load current sensor 16 to the second analog input 43 (msample), and which buffers the switched line voltage 7 from the load side of the separable contacts 14 to the third analog input 44 (voltage). Preferably, the amplifier circuit 48 includes a filter circuit (F) 50, which is a low pass circuit having a cutoff frequency of about 300 Hz for the second analog input 43.

Figure 2A:
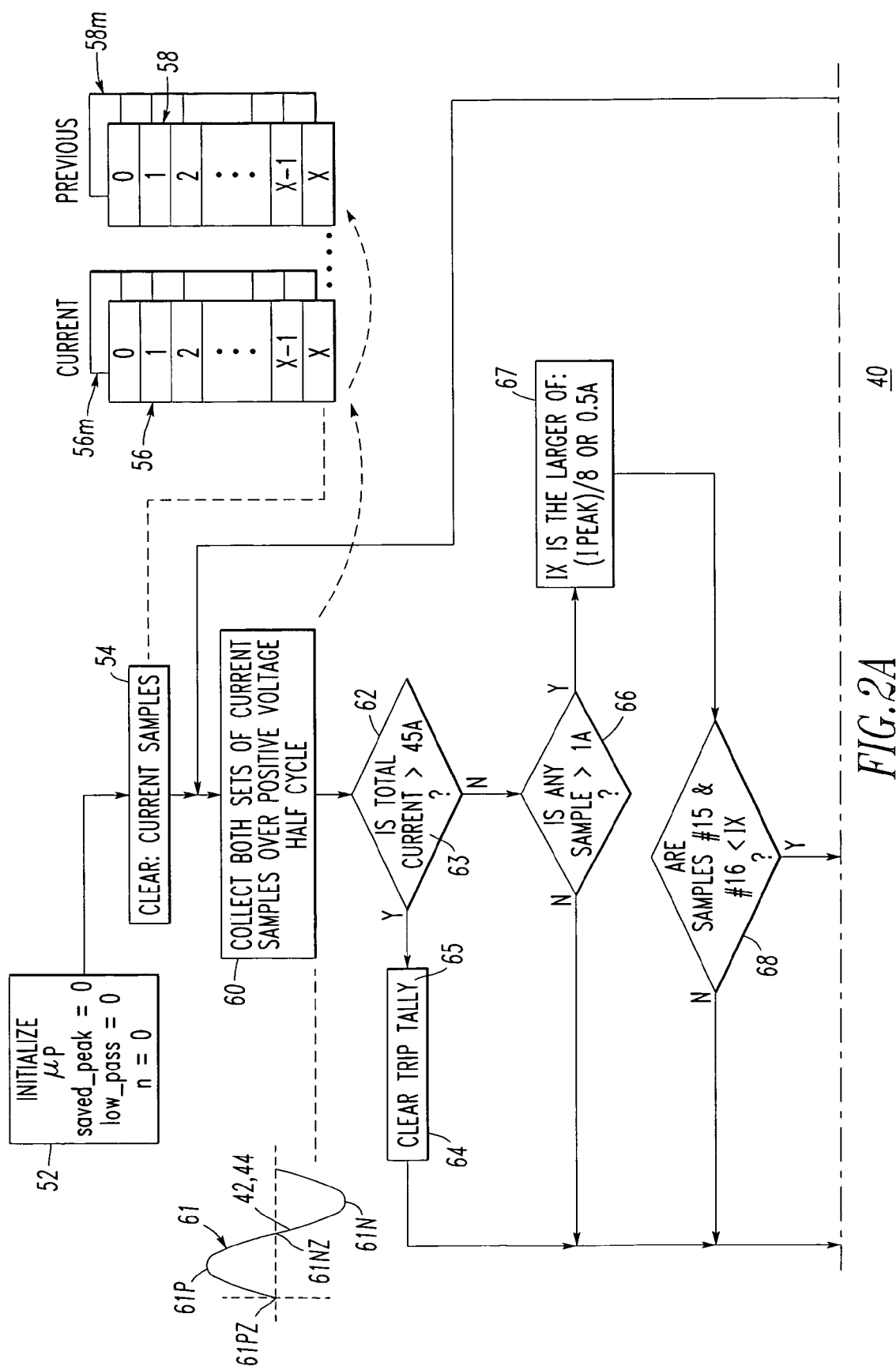
FIGS. 2A-2B form a flowchart of a clearing time algorithm for the processor of FIG. 1 for arc faults resulting from opposing electrodes of a carbonized path arc clearing time test.
Figure 2B:
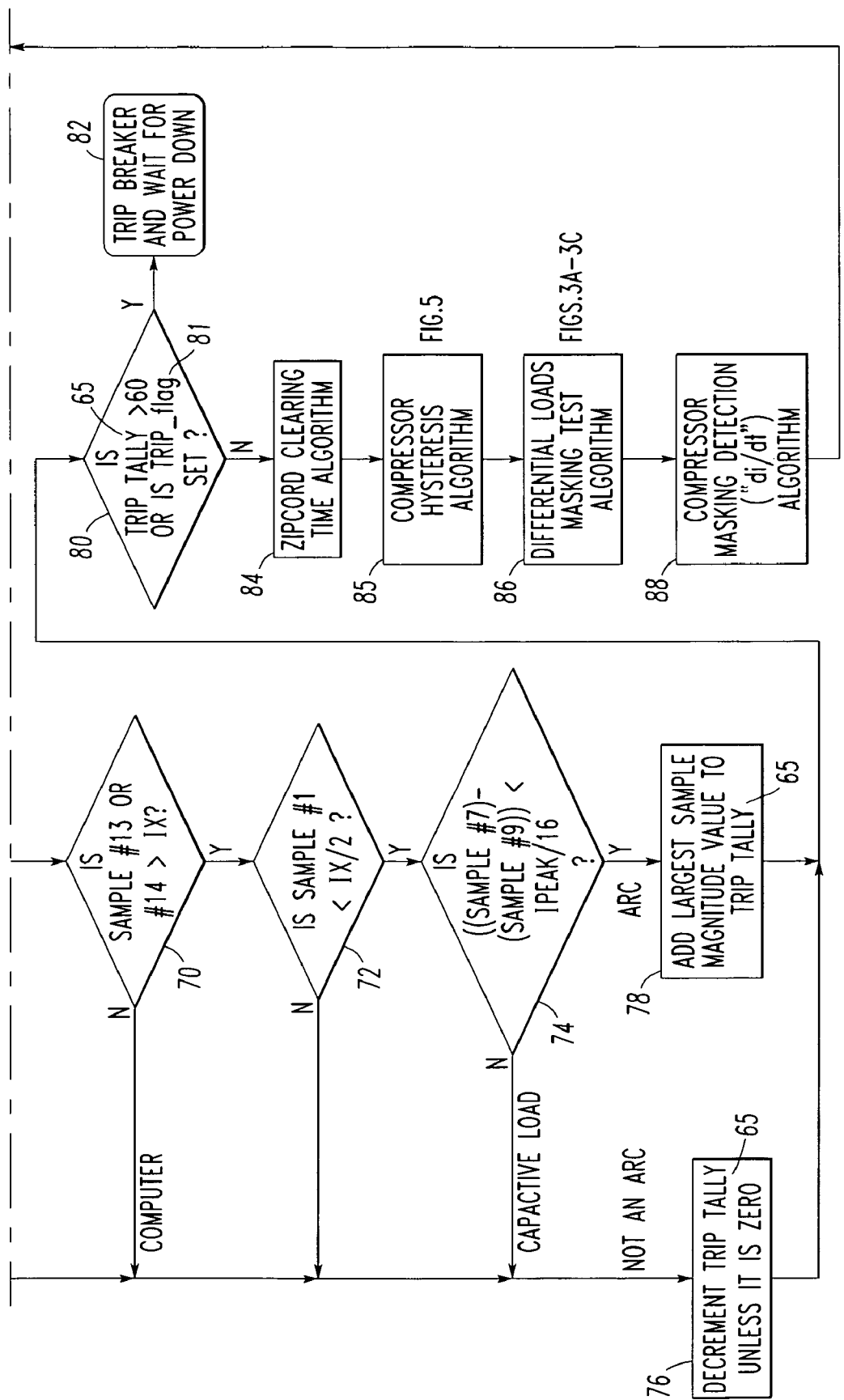

FIGS. 2A-2B show the clearing time algorithm 40 for the processor 24 of FIG. 1. This algorithm 40 is suitable for arc faults resulting from opposing electrodes (not shown) of a carbonized path arc clearing time test. First, at 52, the algorithm 40 initializes the processor 24 of FIG. 1 and various variables (saved_peak, low_pass and n of FIG. 5), before it clears, at 54, current sample arrays 56,56*m*,58,58*m*. Next, at 60, the algorithm 40 copies the values from the current arrays 56,56*m* to the previous arrays 58,58*m,* respectively. Then, the algorithm 40 collects the two current sets of the current samples in the arrays 56 (sample), 56*m* (msample) from the respective analog inputs 42,43 of FIG. 1. In this example, a count (e.g., x+1) of the samples of the sensed current for a current one of the line cycles is about 19 (e.g., sample #0 (or sample (0)) through and including sample #18 (or sample (18)). The voltage line cycles, such as 61, include a positive half cycle 61P and a negative half cycle 61N. Preferably, the algorithm 40 collects the samples of the sensed current for the current one of the line cycles substantially during the positive half cycle 61P and during the start of the negative half cycle 61N, and processes the samples of the sensed current for the current one of the line cycles, in order to generate the second trip signal 25 (FIG. 1) during the negative half cycle 61N. In this example, the line voltage and the sensed current are in phase, and the algorithm 40 collects about 19 of the samples of the sensed current for the current one of the line cycles at a rate of about 32 samples per line cycle. Alternatively, the sensed current may lead or lag the line voltage. The algorithm 40 collects a first one of the samples (sample #0) of the sensed current at about the positive zero crossing 61PZ of the line cycle of the line voltage, as sensed from analog input 44 (voltage) (FIG. 1). For example, the processor 24 employs an edge-triggered interrupt (not shown) that responds to the positive zero crossing 61PZ.

For example, if N is an integer, such as 8, then the algorithm 40 collects about 2N plus three (=19) of the samples of the sensed current for the current one of the line cycles. The algorithm 40 collects an (N+1)th one (e.g., 9th) (e.g., sample #8) of the samples of the sensed current at about the positive peak of the positive half cycle 61P of the line voltage. The capacitive di/dt is maximum (positive) at the line voltage positive peak, while resistive di/dt is zero.

The algorithm collects a (2N+1)th one (e.g. 17th) (e.g., sample #16) of the samples of the sensed current at about the negative zero crossing 61NZ of the line cycle of the line voltage. In this example, two additional samples (e.g., sample #17 and sample #18) are collected during the negative half cycle 61N.

Although the processor 24 of FIG. 1 inputs, converts and stores the values substantially during the positive half cycle 61P plus a relatively small portion of negative half cycle 61N, with subsequent processing in the subsequent portion of negative half cycle 61N, this could be reversed. The processor 24 provides a suitable analog-to-digital conversion (e.g., without limitation, about 16 counts per ampere (peak)) of the sensed current values 22 (FIG. 1) to the digital values in the arrays, such as 56.

Next, at 62, the algorithm 40 determines a total current value (Ipeak) 63, which is the peak or maximum current of the first seventeen values of the current array 56. If the total current value is greater than 45 A, then, at 64, a trip tally 65 is cleared, since the current samples in the array 56 do not represent a low level arc. After step 64, execution resumes at 76 (FIG. 2B). Otherwise, if the total current value is less than 45 A, then execution resumes with the test at 66. If any of the tests at even steps 66-74 fail, then, again, the current samples in the array 56 do not represent an arc and execution resumes at 76. However, if all of the tests at even steps 66-74 pass, then the current samples in the array 56 do represent an arc and execution resumes at 78 (FIG. 2B).

At 66, it is determined if any of the first seventeen current samples in the current array 56 are greater than 1 A. If so, then at 67, a value, Ix, is determined to be the larger of Ipeak/8 or 0.5 A. Next, at 68, it is determined if the sixteenth (e.g., sample (15) or sample #15) and seventeenth samples in the current array 56 are both less than Ix. If so, then at 70, it is determined if either the fourteenth or the fifteenth samples in the current array 56 are greater than Ix. If not, then the load is a computer; but, if so, then at 72, it is determined if the second sample in the current array 56 is less than one half of Ix. If so, then at 74, it is determined if the eighth sample less the tenth sample in the current array 56 is less than one sixteenth of Ipeak 63. If not, then there is a capacitive load. On the other hand, since all of even tests 66-74 have passed, then the load is an arc and execution resumes at 78.

If there was no arc, then step 76 decrements the trip tally 65 by one, unless such trip tally was already zero. Hence, the trip tally 65 is greater than or equal to zero. Otherwise, if there was an arc, then, step 78 adds the total current value (Ipeak) 63, which is the peak or maximum current of the first seventeen values of the current array 56, to the trip tally 65.

After either of the steps 76,78, at 80, it is determined if the trip tally 65 is greater than a suitable threshold (e.g., 60) or if a TRIP_flag 81 (FIG. 3C) was set. If so, then, at 82, the circuit breaker 2 of FIG. 1 is tripped by asserting the second trip signal 25 (FIG. 1), after which the processor 24 awaits power down, since the separable contacts 14 (FIG. 1) and the source of power (not shown) therefrom is to be removed. On the other hand, if the trip tally 65 is not greater than its threshold (e.g., 60) and if the TRIP_flag 81 was not set, then four routines 84, 85 (FIG. 5), 86 (FIGS. 3A-3C) and 88 are sequentially executed before execution resumes at 60 (FIG. 2A). Routine 84 provides a zip cord clearing time algorithm. Routine 85 provides a compressor hysteresis determining algorithm. Routine 86 provides a differential loads masking test algorithm. Routine 88 provides a compressor masking detection (di/dt) algorithm.

Figure 3A:
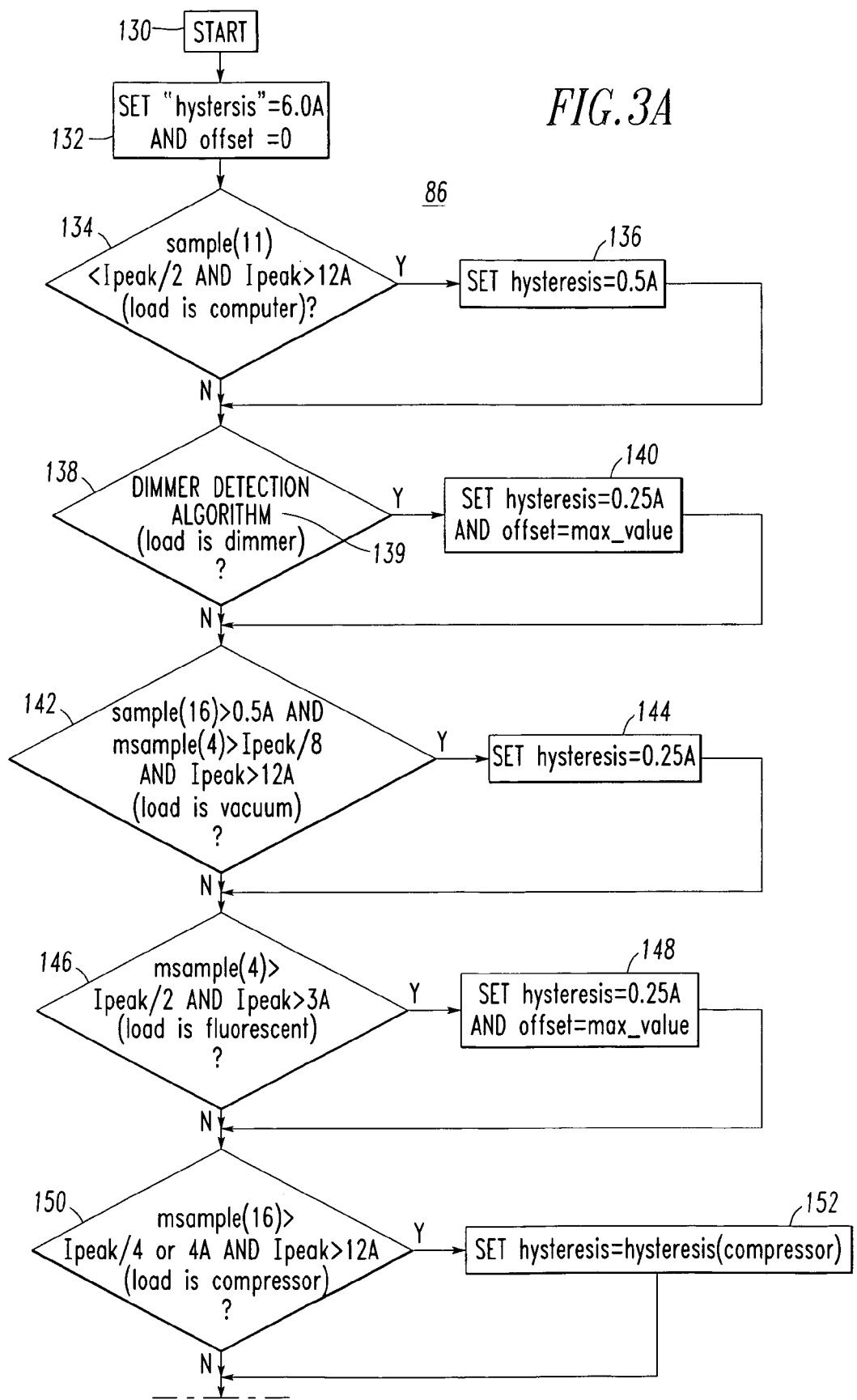
FIGS. 3A-3C form a flowchart of a differential loads masking test algorithm for the processor of FIG. 1.
Figure 3B:
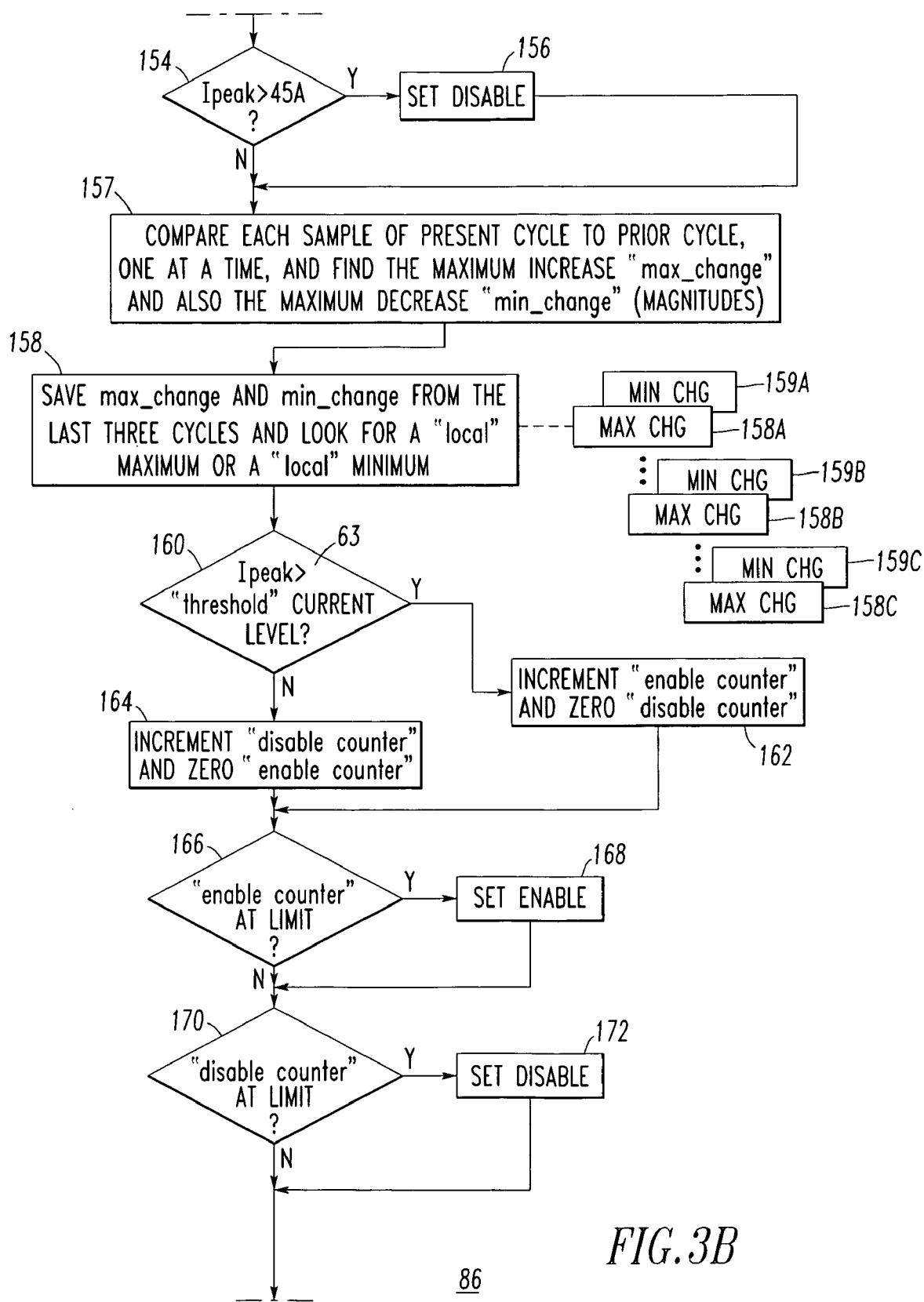
Figure 3C:
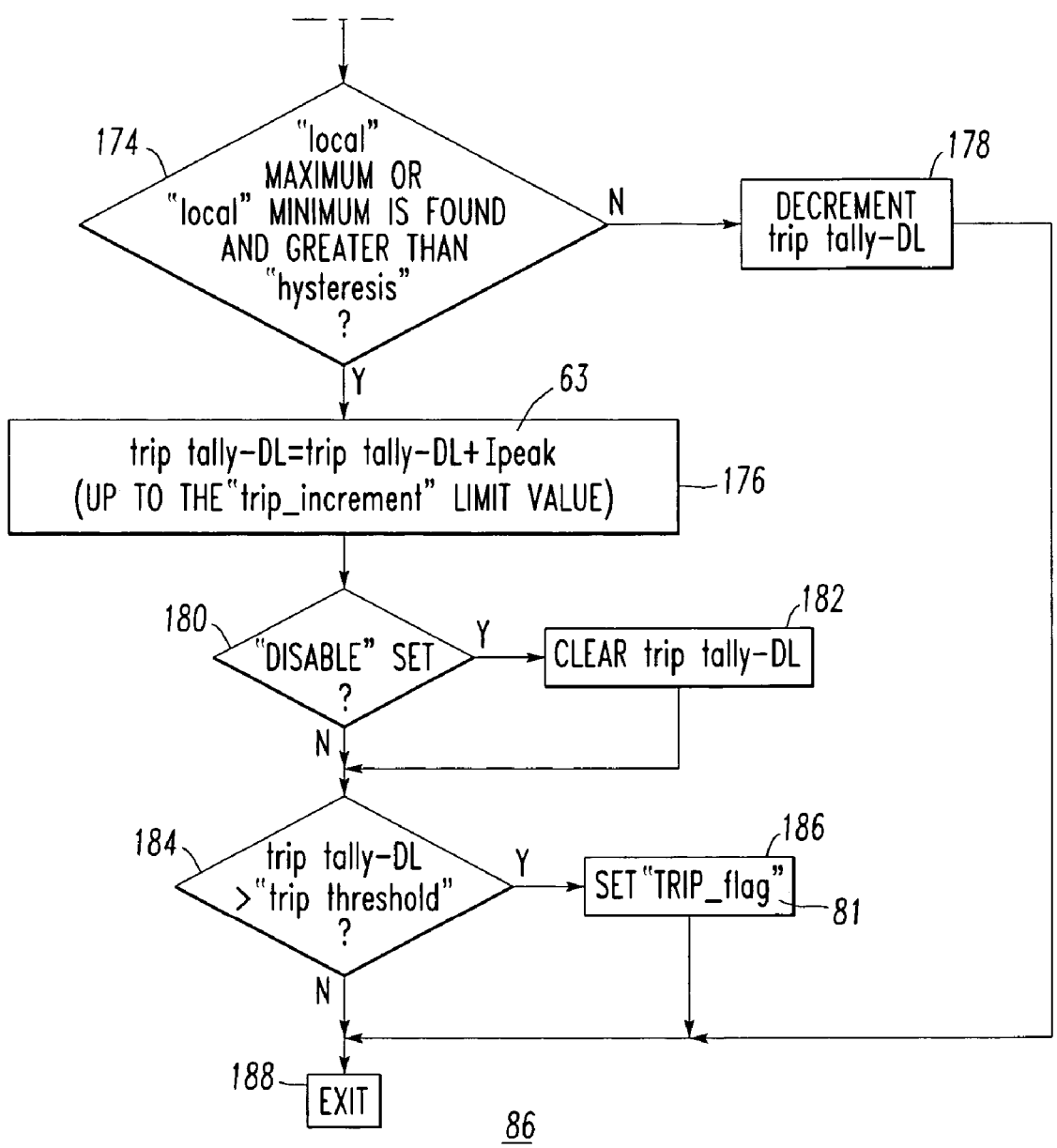

FIGS. 3A-3C show the differential loads masking test routine 86 of FIG. 2B. Unless suitable settings are provided, non-arcing loads may mask an arc fault. After starting at 130, the routine 86 determines whether the load is one of a computer, a dimmer, a vacuum cleaner, a fluorescent light or a compressor. First, at 132, default values of "hysteresis" (e.g., 6.0 A) and "offset" (e.g., 0 A) are initialized. Next, at 134, it is determined if the load is a computer by checking if the twelfth sample (e.g., sample (11)) in the current (unfiltered) array 56 (FIG. 2A) is less than Ipeak/2 and if Ipeak is greater than 12 A. If so, then at 136, "hysteresis" is set to 0.5 A and execution resumes at 138. On the other hand, if the test failed at 134, then at 138, it is determined if the load is a dimmer by employing a suitable dimmer detection algorithm 139. If so, then at 140, "hysteresis" is set to 0.25 A, "offset" is set to a maximum value (e.g., about one half of the rated trip current) and execution resumes at 142. On the other hand, if the test failed at 138, then at 142, it is determined if the load is a vacuum cleaner by checking if the seventeenth sample in the current (unfiltered) array 56 is greater than 0.5 A, if the fifth sample in the current (filtered) array 56*m* (FIG. 2A) is greater than Ipeak/8, and if Ipeak is greater than 12 A. If so, then at 144, "hysteresis" is set to 0.25 A and execution resumes at 146. On the other hand, if the test failed at 142, then at 146, it is determined if the load is a fluorescent light by checking if the fifth sample in the current (filtered) array 56*m* is greater than Ipeak/2 and if Ipeak is greater than 3 A. If so, then at 148, "hysteresis" is set to 0.25 A, "offset" is set to the maximum value (e.g., about one half of the rated trip current) and execution resumes at 150. On the other hand, if the test failed at 146, then at 150, it is determined if the load is a compressor by checking if the seventeenth sample in the current (filtered) array 56*m* is greater than Ipeak/4 or 4 A, and if Ipeak is greater than 12 A. If so, then at 152, "hysteresis" is set to "hysteresis(compressor)" as determined by algorithm 200 (FIG. 5) and execution resumes at 154 (FIG. 3B). In this hierarchy, a compressor, for example, overrides any prior settings of the hysteresis. On the other hand, if the test failed at 150, then at 154, it is determined if Ipeak 63 is greater than 45 A. If not, then execution resumes at 157. Otherwise, at 156, a flag is set to a DISABLE state before step 157 is executed.

Step 157 subtracts from each sample of the present cycle in the current (unfiltered) array 56 (FIG. 2A), one at a time, each sample of the previous cycle in the previous (unfiltered) array 58 (FIG. 2A). From these subtractions, a maximum (absolute value) increase ("max_change") value and a maximum (absolute value) decrease ("min_change") value are determined for each cycle. For example, for normal, repetitive sine waves, the "max_change" value and, the "min_change" value are both about zero. As a simple example, if all of the corresponding values of the arrays 56,58 are identical except for four samples, with sample seven of the array 58 being 50, sample seven of the array 56 being 55, sample eleven of the array 58 being 30, and sample eleven of the array 56 being 26, then the change values are all zero, except for the change value of the seventh samples being 5 (=55−50) and the change value of the eleventh samples being −4 (=26−30). Hence, in this example, the "max_change" value is 5 and the "min_change" value is 4, which is the absolute value of −4.

Step 158 saves the "max_change" value (MAX CHG 158A) and the "min_change" value (MIN CHG 159A) for the present cycle. Similarly, that step has also saved the values 158B,159B and 158C,159C, which are based on samples from the past three cycles, for the past two cycles.

Step 158 also determines if there is a local maximum in the saved values 158A,158B,158C or a local minimum in the saved values 159A,159B,159C. The value of the local minimum or the local maximum is the smallest amount that a saved value (e.g., 158B; 159B) is greater than its neighbors on either side (e.g., 158A,158C;159A,159C). If the saved value is not greater than both of its neighbors on either side, then the value of the local minimum or local maximum is zero. For example, if the three values of interest from 158A,158B,158C were 10, 15 and 10, then 5 (=15−10) is the local maximum. As another example, if the three values of interest were 5, 10 and 15, then there is no local maximum (since the values are increasing) and the value of the local maximum is zero. As another example, if the three values of interest from 159A,159B,159C were 5, 10 and 5, then 5 (=10−5) is the local minimum.

Next, at 160, it is determined if Ipeak 63 is greater than a "threshold" current value (e.g., without limitation, 1.0 A). If so, then at 162, an "enable counter" is incremented and a "disable counter" is zeroed. Otherwise, if Ipeak 63 was less than or equal to the "threshold" current value, then at 164, the "disable counter" is incremented and the "enable counter" is zeroed. Next, at 166, it is determined if the enable counter is at its limit (e.g., without limitation, about 1.5 s). If so, then at 168, the flag of step 156 is set to the ENABLE state. On the other hand, if the enable counter is not at its limit, or after 168, it is determined, at 170, if the disable counter is at its limit (e.g., without limitation, about 0.5 s). If so, then at 172, the flag of step 156 is set to the DISABLE state. On the other hand, if the disable counter is not at its limit, or after 172, step 174 is executed.

At 174 (FIG. 3C), if a local maximum or a local minimum was found at 158, then if either or both of those values are greater than the "hysteresis" value, as was determined by even steps 132-152 (FIG. 3A), then at 176, a differential loads trip tally value ("trip tally-DL") is increased by the value of Ipeak 63 plus the value of "offset" from one of steps 132,140,148, but that sum is limited by the "trip_increment" limit value (e.g., without limitation, a suitable constant; 331). On the other hand, if the test at 174 failed, then at 178, the differential loads trip tally value ("trip tally-DL") is decremented before the routine 86 exits at 188. Note that this operation must occur twice if both a local maximum and a local minimum are observed.

After 176, at 180, if the flag of step 156 is set to the DISABLE state, then the differential loads trip tally value ("trip tally-DL") is cleared at 182. Otherwise, or after 182, at 184, it is determined if the differential loads trip tally value ("trip tally-DL") is greater than the "trip threshold" value (e.g., without limitation, a suitable constant; 827). If so, then the TRIP_flag 81 of step 80 of FIG. 2B is set at 186. Otherwise, or after 186, the routine 86 exits at 188.

Figure 4:
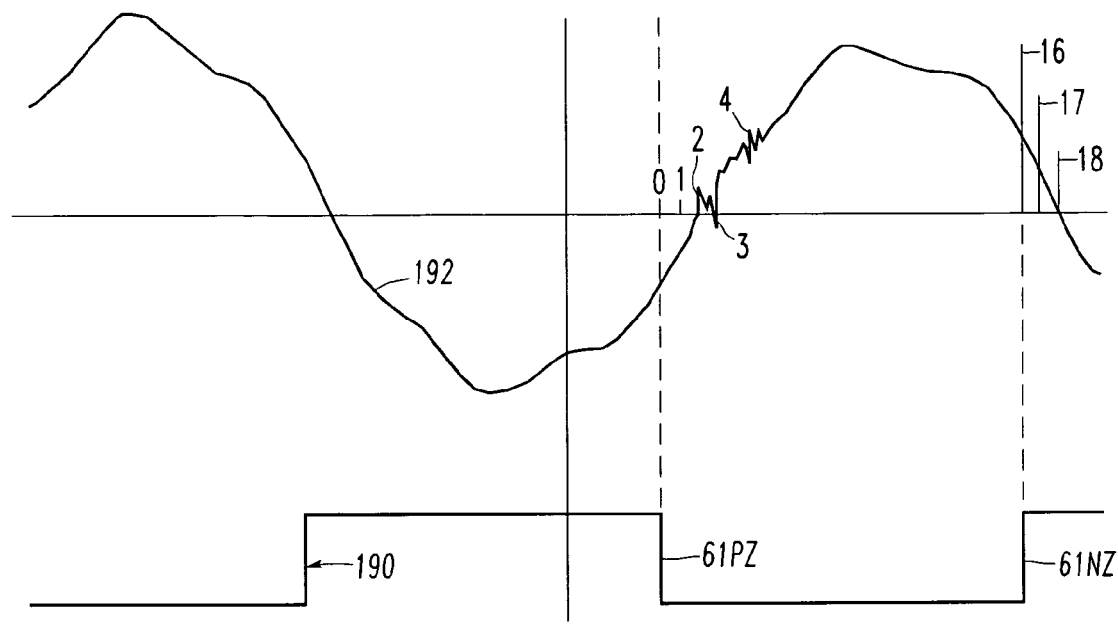
FIG. 4 is a plot of alternating current voltage zero crossings and current for a capacitor start (air compressor type) motor.

FIG. 4 is a plot of alternating current voltage zero crossings 190 and current 192 (e.g., analog sensed current 22 of FIG. 1) for a capacitor start (air compressor type) motor (not shown). The alternating current voltage zero crossings 190, which are shown as an inverted digital signal, include the positive zero crossing 61PZ and negative zero crossing 61NZ of FIG. 2A. For convenience of reference, the approximate sample times of the samples: sample (0), sample (1), sample (2), sample (3), sample (4), sample (16), sample (17), and sample (18), are shown.

Figure 5:
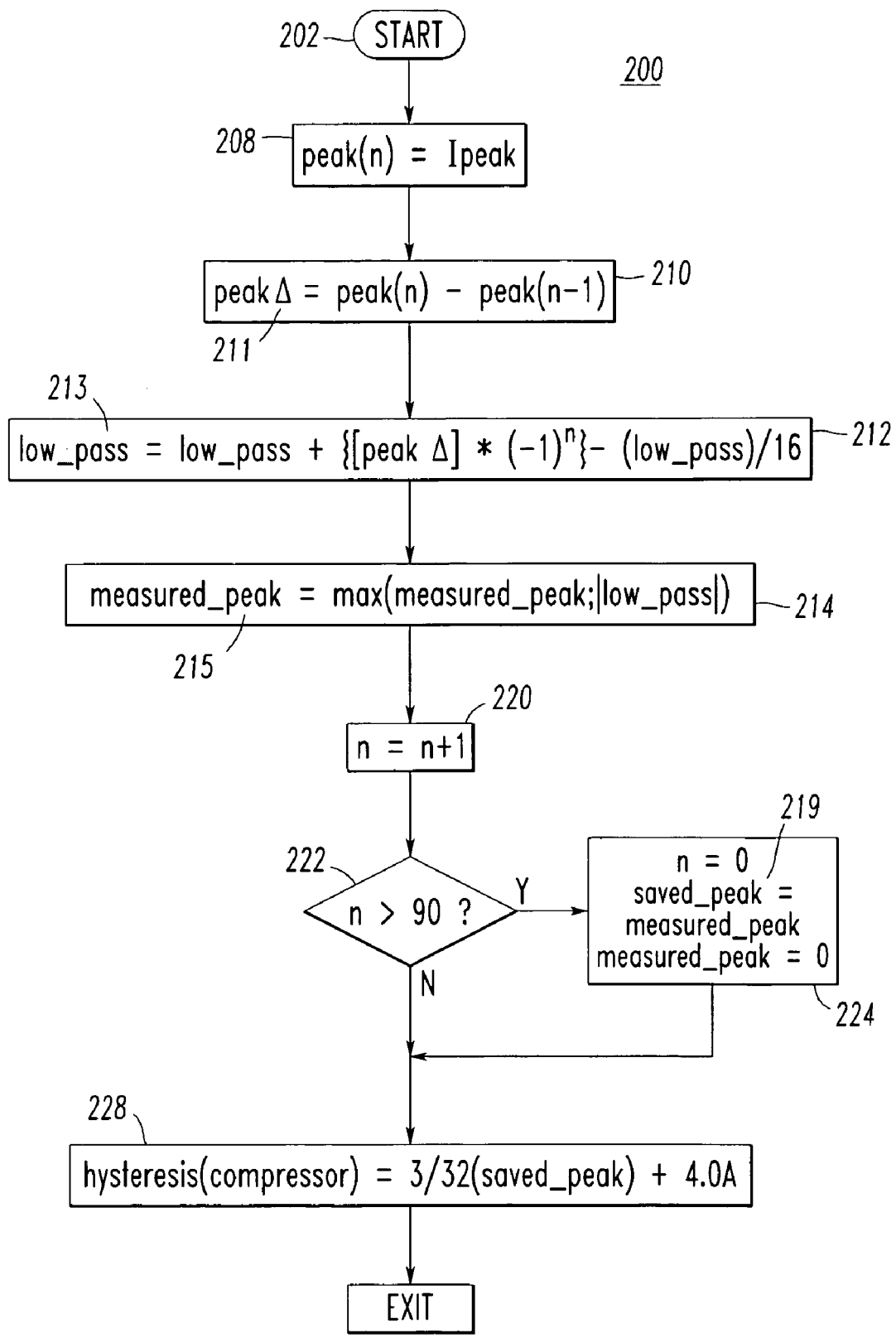
FIG. 5 is a flowchart of an algorithm to detect and measure the periodic noise level of a compressor load, while ignoring noise attributed to arc fault conditions, for the processor of FIG. 1.

FIG. 5 show an algorithm 200 to detect and measure the periodic noise level of a compressor load (e.g., ½ frequency sub-harmonic (e.g., 30 Hz sub-harmonic for a 60 Hz system) current amplitude modulation) while ignoring noise attributed to arc fault conditions, for the arc fault detection circuit 24 of FIG. 1. After starting at 202, at 208, the array, peak(i), is updated as shown in Equation 1:

$$\text{peak}(n) = I\text{peak} \quad \text{(Eq. 1)}$$

wherein:
n is the line cycle number (e.g., n=1, 2, 3, . . . 90).
Next, at 210, the cycle-to-cycle peak difference, peakΔ 211, is determined from Equation 2:

$$\text{peak}\Delta = \text{peak}(n) - \text{peak}(n-1) \quad \text{(Eq. 2)}$$

Then, step 212 measures and low-pass filters the periodic cycle-to-cycle variation in the peak current 63 from Equations 3A or 3B:

$$\text{low\_pass} = \text{low\_pass} + \{[\text{peak}(n) - \text{peak}(n-1)]*(-1)^n\} - (\text{low\_pass})/16 \quad \text{(Eq. 3A)}$$

$$\text{low\_pass} = \text{low\_pass} + \{[\text{peak}\Delta]*(-1)^n\} - (\text{low\_pass})16 \quad \text{(Eq. 3B)}$$

wherein:
low_pass 213 is initially set to zero at 52 of FIG. 2A.
Next, step 214 determines the measured peak, measured_peak 215, of the absolute value of low_pass 213, |low_pass|. This value is either the value of measured_peak 215 from the previous line cycle, or, else, is the value of |low_pass| for the present line cycle if that value is greater than the value of measured_peak 215 from the previous line cycle.

Then, the integer, n, is incremented at 220. Next, at 222, if n is not greater than 90, in this example, then execution resumes at 228. Otherwise, at 224, the saved value, saved_peak 219, is set equal to the measured_peak 215, and the line cycle number n and the measured_peak 215 are set to zero. Then, at 228, the variable hysteresis(compressor) is set to 3/32 times the variable saved_peak plus a fixed value of 4.0 A. The hysteresis(compressor) value is employed to de-sensitize the hysteresis value of step 152 of the differential loads masking test algorithm 86 of FIG. 3A.

The saved value, saved_peak 219, may also advantageously be employed to classify the load as, or to further confirm the load to be, a compressor, at step 228, whenever (saved_peak)/16 is greater than a suitable threshold (e.g., without limitation, 1 A).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault circuit interrupter comprising:
a line terminal;
a load terminal;
separable contacts electrically connected between said line terminal and said load terminal;
a current sensor adapted to sense current flowing between said line terminal and said load terminal and through said separable contacts, said sensed current including a plurality of line cycles;
an arc fault detection circuit adapted to collect a plurality of samples of said sensed current for each of said line cycles, determine a peak current value from said samples of said sensed current for each of said line cycles, determine a difference value for each of said line cycles from the peak current value of a corresponding one of said line cycles less the peak current value of the previous one of said line cycles, change the sign of said difference value on alternate ones of said line cycles, low pass filter the changed sign difference value for each of said line cycles to provide a low pass filtered value for each of said line cycles, determine a peak value from the absolute value of the low pass filtered value for each of said line cycles over a predetermined count of said line cycles, save the peak value as a saved peak value after the predetermined count of said line cycles, determine a hysteresis value as a function of the saved peak value, and generate a trip signal responsive to the sensed current and the hysteresis value; and
an operating mechanism adapted to open said separable contacts responsive to said trip signal.

2. The arc fault circuit interrupter of claim 1 wherein said arc fault detection circuit is further adapted to determine said difference value, said low pass filtered value and said peak value for about ninety of said line cycles before saving said peak value and then resetting said low pass filtered value and said peak value and determining a new value of said hysteresis value.

3. The arc fault circuit interrupter of claim 1 wherein said line cycle corresponds to a line voltage having a line cycle with a positive zero crossing and a negative zero crossing; wherein said arc fault detection circuit collects a first one of said samples of said sensed current at about the positive zero crossing of the line cycle of said line voltage and a last one of said samples of said sensed current at about the negative zero crossing of the line cycle of said line voltage; and wherein said peak current of said line cycle is the maximum of said samples of said line cycle.

4. The arc fault circuit interrupter of claim 3 wherein the last one of said samples is a seventeenth one of said samples.

5. The arc fault circuit interrupter of claim 3 wherein said arc fault detection circuit collects and saves said samples of said sensed current for four consecutive ones of said line cycles; wherein for three consecutive ones of said line cycles said arc fault detection circuit determines differences between each of the samples of one of the line cycles and each of the samples of an immediately previous one of the line cycles and determines a maximum positive value and a maximum negative value from said differences for said three consecutive ones of said line cycles; wherein said arc fault detection circuit determines whether there is one or both of a local maximum value and a local minimum value from said determined maximum positive value and said determined maximum negative value over said three consecutive ones of said line cycles; and wherein said arc fault detection circuit determines that said local maximum value or said local minimum value is greater than said hysteresis value and responsively adds said total current value to a trip tally.

6. The arc fault circuit interrupter of claim 5 wherein said hysteresis value is at least about four amperes.

7. The arc fault circuit interrupter of claim 6 wherein said arc fault detection circuit is adapted to clear said trip tally when said total current value is greater than a predetermined value.

8. The arc fault circuit interrupter of claim 6 wherein said arc fault detection circuit includes an enable counter and a disable counter; and wherein when said total current value is greater than a predetermined value said enable counter is incremented and said disable counter is zeroed.

9. The arc fault circuit interrupter of claim 8 wherein said arc fault detection circuit further includes a flag having an enable state and a disable state; wherein said enable counter includes a first limit; wherein said disable counter includes a second limit; wherein said flag is set to said enable state when said enable counter exceeds said first limit; and wherein said flag is set to said disable state when said disable counter exceeds said second limit.

10. A method of determining a hysteresis value for an arc fault circuit interrupter, said method comprising:
- sensing a plurality of samples of current for each of a plurality of line cycles;
- determining a peak current value from said samples of current for each of said line cycles;
- determining a difference value for each of said line cycles from the peak current value of a corresponding one of said line cycles less the peak current value of the previous one of said line cycles;
- changing the sign of said difference value on alternate ones of said line cycles;
- low pass filtering the changed sign difference value for each of said line cycles to provide a low pass filtered value for each of said line cycles;
- determining a peak value from the absolute value of the low pass filtered value for each of said line cycles over a predetermined count of said line cycles;
- saving the peak value as a saved peak value after the predetermined count of said line cycles; and
- determining a hysteresis value as a function of the saved peak value.

11. The method of claim 10 further comprising outputting said current from said arc fault circuit interrupter to a load which is a compressor; and confirming that said load is said compressor when a portion of said saved peak value is greater than a predetermined value.

12. The method of claim 10 further comprising employing a value, low_pass, as said low pass filtered value; employing a value, peakΔ, as said difference value; employing an integer, n, to identify the corresponding one of said line cycles; and calculating said low pass filtered value from:

$$\text{low\_pass} = \text{low\_pass} + \{[\text{peak}\Delta]*(-1)^n\} - (\text{low\_pass})/16.$$

13. The method of claim 10 further comprising determining said hysteresis value as being 3/32 of said saved peak value plus a predetermined value.

14. The method of claim 10 further comprising determining said difference value, said low pass filtered value and said peak value for about ninety of said line cycles before saving said peak value and then resetting said low pass filtered value and said saved peak value and determining a new value of said hysteresis value.

15. An arc fault circuit interrupter for a compressor load, said arc fault circuit interrupter comprising:
- a line terminal;
- a load terminal;
- separable contacts electrically connected between said line terminal and said load terminal;
- a current sensor adapted to sense current flowing between said line terminal and said load terminal and through said separable contacts, said sensed current including a plurality of line cycles;
- an arc fault detection circuit adapted to collect a plurality of samples of said sensed current for each of said line cycles, determine a peak current value from said samples of said sensed current for each of said line cycles, determine a hysteresis value for said compressor load as a function of differences between the peak current values of said line cycles, and generate a trip signal responsive to said sensed current and said hysteresis value; and
- an operating mechanism adapted to open said separable contacts responsive to said trip signal.

* * * * *